Patented Oct. 7, 1941

2,258,321

UNITED STATES PATENT OFFICE 2,258,321

CONDENSATION PRODUCTS OF AMINES AND MONOALKYLOL CYANAMIDES

Walter P. Ericks, Cos Cob, Conn., assignor to American Cyanamid Company, New York, N. Y., a corporation of Maine No Drawing. Application August 12, 1939, Serial No. 289,833

7 Claims. (Cl. 260—564)

This invention relates to new condensation products, to a process for preparing them, and to surface-active compositions containing the same.

The condensation products which may be obtained by condensing in accordance with the process of this invention a monoalkylol cyanamide with a primary or secondary amine are substituted guanidines and biguanides of the probable formula

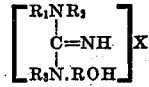

as will be described hereinafter.

The monoalkylol cyanamides are compounds which may be produced by reacting an aqueous slurry of calcium cyanamide or other alkaline earth metal salt of cyanamide with one or more moles of an alkylene oxide such as ethylene, propylene, etc., as described in my Patent No. 2,244,421.

The monoalkylol cyanamides may also be produced by reacting an alkylene oxide with an aqueous solution of sodium cyanamide. A known method of producing monoethylol cyanamide consists in preparing a solution of sodium cyanamide by treating an aqueous slurry of calcium cyanamide at temperatures below 25° C. with a solution of sodium hydroxide and filtering off the insolubles. A less than theoretical quantity of ethylene oxide at a temperature not exceeding 10° C. is then added to the aqueous solution of sodium cyanamide while stirring and the cold mixture allowed to stand over night. The monoethylol cyanamide in the mixture is then extracted with portions of chloroform followed by evaporation of the chloroform from the extract under reduced pressure to recover the product.

The chemical constitution of the monoalkylol cyanamides has not, so far as is known, been definitely determined. The monoethylol cyanamide, for example, can exist in at least four tautomeric forms and the names, hydroxyethyl cyanamide, cyanaminoethyl alcohol, 2 amino oxazoline and ethylene urea, have been used to refer to the compound and its isomer. In the present invention the monoalkylol cyanamides are considered to have the following probable formula NCNHROH in which R is either an alkyl, an alkoxyalkyl or an hydroxy alkyl radical, depending on whether one or several moles of an alkylene oxide or an hydroxy alkyl oxide, such as glycidol, [CH₂.O.CH₂(OH)CH₂OH], is or are reacted with each mole of the cyanamide metal salt.

The monoalkylol cyanamides are polymerizable by heat and accordingly when heated they will form as an intermediate polymerization product, the respective dimers of the probable structural formula

in which R is as defined above. Therefore it is intended that the term monoalkylol cyanamide as used hereinafter in both the specification and the claims shall include both the unpolymerized monoalkylol cyanamide and the dimer thereof when present, unless provision therefor has otherwise been made therein.

The monoalkylol cyanamides may be condensed by the process of this invention with a primary amine of the formula R₁NH₂ in which R₁ is an alkyl radical containing at least 4 carbon atoms, an aralkyl radical containing at least 3 carbon atoms in an alkyl substituent or an aryl radical; or with a secondary amine of the formula R₁NHR₂ in which R₁ is as defined above and R₂ is an alkyl, aralkyl or aryl radical, to form condensation products having surface activity of the cation-active type. In cases where amines of the above-defined classes form condensation products which lack adequate water-solubility, such as may occur on the condensation of long chain alkyl or aralkyl amines, the introduction of one or more water solubilizing groups, such as hydroxy groups, into the molecule of the monoalkylol cyanamide before its condensation with such an amine may be resorted to.

The method of the present invention for producing condensation products having surface activity of the cation-active type comprises heating together a primary or secondary amine as defined above with a monoalkylol cyanamide in the presence of an acidic residue. While the heating of the components may be carried out in any manner found suitable I have found that an acid should be present in the mixture of the monoalkylol cyanamide and the amine in order to effect the condensation. By the term, an acid, is meant any suitable acid such as hydrochloric acid, sulfuric acid, acetic acid, etc. The acid may be introduced into the reaction mixture by neutralizing one of the components with the acid and then adding the product of the neutralization to the other component or the acid may be added to the components in the reaction vessel or introduced in any other way found suitable.

The cation surface active products which may be produced by the foregoing process are of the following probable formula

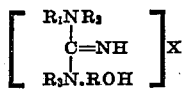

in which R is one of the group consisting of alkyl, alkoxy-alkyl and hydroxy alkyl radicals, $R_1$ is one of the group consisting of an alkyl radical having 4 or more carbon atoms, an aralkyl radical having 3 or more carbon atoms in an alkyl group and an aryl radical, $R_2$ is one of the group consisting of hydrogen, alkyl, aralkyl and aryl radicals, X is a salt-forming acid and $R_3$ is one of the group consisting of hydrogen and the guanyl radical

in which R is as defined above. Because the monoalkylol cyanamides polymerize under the action of heat, $R_3$ may concurrently be hydrogen and the guanyl residue of the monoalkylol cyanamide dimer depending of course on the presence or absence of the dimer with the unpolymerized cyanamide. Accordingly the biguanide derivative from the condensation of the dimer may be present in the condensation product along with the guanidine from the condensation of the unpolymerized monoalkylol cyanamide when a monoalkylol cyanamide and an amine as defined above are condensed in accordance with the process of this invention. In this respect I have prepared the biguanide product by heating the monoalkylol cyanamide to form the dimer thereof and condensing the dimer by heating it in the presence of an acidic residue with a half-molecular equivalent of the amine.

In accordance with the above method I have prepared condensation products of the foregoing probable structural formula by heating together monoethylol cyanamide hydrochloride with butylamine; monoethylol cyanamide acetate with dodecylamine; monoisopropylol cyanamide hydrochloride with dodecylamine and monoisopropylol cyanamide with dodecylamine hydrochloride; monoethylol cyanamide with di-n-propylamine, hydrochloric acid having been added to the incompatible mixture of the components; mono-2,3-dihydroxypropyl cyanamide hydrochloride with a mixed amine containing chiefly hexadecylamine and some octadecylamine; monoethylol cyanamide hydrochloride with aniline and with diphenylamine; mono-nonethoxyethylol cyanamide with isoamyl aniline hydrochloride, and the dimer of monoethylol cyanamide with dodecylamine, acetic acid having been added to the incompatible layers of the components. These products are oily or waxy substances, in part easily soluble in water and in part dispersible therein and which can be made soluble in water by the addition of an acid such as hydrochloric or acetic acid.

The preparation of the foregoing condensation products demonstrates the applicability in general of the process of the present invention to the preparation of cation surface active condensation products from the monoalkylol cyanimides, including the dimers thereof, and the primary and secondary amines defined above.

The cation surface active products obtainable by the process of this invention can, according to the extent and nature of their surface activity, be used as emulsifying agents, detergents in acid solution, wetting agents, demulsifiers for breaking oil emulsions, in the formulation of printing inks, dye baths, dye pastes, for depositing rubber latex emulsions on cloth, as flotation agents, as photographic assistants, as plasticizers, as emulsifiers of resins and waxes, as softeners for leather, in cosmetics, etc.

The preferred new products of the present invention are the cation surface active products obtained by condensing dodecylamine with monoethylol cyanamide and monoisopropylol cyanamide respectively and that produced by condensing a mixed amine containing chiefly hexadecylamine and some octadecylamine with mono-2,3-dihydroxypropyl cyanamide. These products exhibited emulsifying power, and wetting power in acid solution. The first and last named products are by themselves softening agents for cotton cloth.

The invention is further illustrated by the following specific examples. It should be understood, however, that these examples are given primarily for purposes of illustration and that although they may describe certain of the more specific details of the invention, its broader aspects are not limited thereto.

*Example 1*

Equimolecular quantities of monoethylol cyanamide hydrochloride and butylamine were mixed without external heating. An exothermic reaction occurred. After gentle heating to complete the reaction, the product obtained was an oil-like liquid easily soluble in water and foamed on shaking therewith.

*Example 2*

Monoethylol cyanamide acetate and dodecylamine in equimolecular proportions were condensed as follows:

To 57.4 grams of monoethylol cyanamide (90%) were added, with stirring, 40 cc. of glacial acetic acid. To the resulting viscous, colorless liquid were added without external heating 111.4 grams of dodecylamine. The temperature of the mixture was observed to rise to 78° C. whereupon the mixture was heated at 110–120° C. for 30 minutes. The product was light colored and wax-like in appearance, easily dispersible in cold water and soluble in warm water.

The product is an emulsifier for kerosene and glyceride oils. Kerosene was readily emulsified when 10 cc. thereof was shaken with 90 cc. of water containing 1% of the product solubilized by the addition of sufficient acetic acid to make a neutral solution thereof, and 1% of the product to which acetic acid had been added in slight excess, respectively. As an emulsifier of glyceride oils, well dispersed olive oil was obtained when 10 cc. of the oil was shaken with 90 cc. of water containing 1% of the product, solubilized as aforesaid.

The product showed good wetting power in aqueous solution at 50° C. and in 1% acetic acid solution. The product made up in 10% concentration in 2% citric acid solution gave a pale yellow solution which foamed readily and is suitable as a shampoo.

The product may also be used as a demulsifying agent for the breaking of petroleum emulsions in ratios of 1:100 to 1:5000 parts by weight based on the weight of the dehydrated oil. It may be used in admixture with diluents, extenders and the like such as benzol, toluol, phenol, cresol, light mineral oils and the like or in conjunction with other demulsifiers or deflocculators such as castor oil, other sulfonated vegetable or animal oils and inorganic compounds such as trisodium phosphate, tetra sodium pyrophosphate, sodium methaphosphate, borax and the like.

When the disperse phase (water) of the petroleum emulsion contains inorganic salts in solution it is negatively charged. The cation-active agents naturally have an affinity for such solutions and should therefore be operative when the ordinary anion-active agents would be of less value.

For the application of the products to the demulsification of the petroleum emulsions any of the ordinary methods now in use, such as by injecting the agent into the wells or into pipes leading from the wells or into the tank containing the oil emulsion with or without heating of the emulsion, may be used. A particularly valuable method is to introduce a solution of the surface-active agent into the bottom of a body of the oil emulsion and without agitation permitting the treating agent to rise by gravity through the oil. It is evident that any of the cation-active compounds of the present invention may be used in such manner for treating petroleum emulsions of the water-in-oil type.

Example 3

Monoisopropylol cyanamide and dodecylamine hydrochloride in equimolecular proportions were condensed as follows:

55.6 grams of dodecylamine were made neutral to litmus with 31 cc. of concentrated hydrochloric acid. To the resulting thick fluffy paste 25.8 grams of monoisopropylol cyanamide (74.6%) were added and the reactants stirred and heated in 1 hour to 120° C. In order to prevent foaming a little ethyl alcohol (2B) was added to the mixture, after which the temperature was allowed to rise to 160° C. The product on cooling was a light colored waxy substance which disperses in cold and warm water, foams on shaking with water, and is completely soluble in warm dilute hydrochloric acid.

The product solubilized with hydrochloric acid readily emulsified kerosene following the procedure therefor set out in Example 2. In like manner the glyceride oil, olive oil, was excellently dispersed, using 1% of the solubilized product.

The product showed good wetting power in 1% hydrochloric acid solution. Cotton cloth impregnated with a 2% solution of the product for 1 minute at 140° F. and dried 5 minutes at 250° F. was soft and after scouring with soap and soda ash for 30 minutes at 160° F. showed excellent softness. The cloth was subjected to a second severe scouring and on this test still showed softness. Cotton cloth impregnated with a ¾% solution of the product after a soaping for 30 minutes at 105° F., changing soap solution at the end of 15 minutes, also showed softness.

On the addition of a soap solution to a solution of the product, a white water-insoluble colloid was formed. The after-developed durable type softness in the cloth is due to the formation of such a colloid on the fibers.

This product was also produced by condensing an excess of monoisopropylol cyanamide hydrochloride with dodecylamine (molar ratio of 2:1) as follows: 25.8 grams of monoisopropylol cyanamide (74.6%) were neutralized with concentrated hydrochloric acid and the mixture evaporated at 125° F. in an air-drying oven. To the resulting product were added with stirring 27.8 grams of dodecylamine and the mixture was heated slowly to 155° C. The resulting material was a light-colored wax-like product containing excess monoisopropylol cyanamide hydrochloride and its polymers.

Example 4

Mono-2,3-dihydroxypropyl cyanamide hydrochloride was condensed with a mixed amine consisting chiefly of hexadecylamine with some octadecylamine as follows:

To 56.6 grams of mono-2,3-dihydroxypropyl cyanamide hydrochloride (90%) were added with mixing 90.8 grams of the mixed amine and the mixture heated slowly to 140° C. Heating of the mixture was continued at 130–140° C. for 30 minutes. The product on cooling was a brown colored waxy paste dispersible in water and foaming therewith on shaking.

As an emulsifier of vegetable oils, olive oil was well dispersed when shaken with water containing 1% of the solubilized product as emulsifier, following the procedure therefor given in Example 2.

The product showed wetting power in 1% hydrochloric acid solution. Cotton cloth impregnated with a solution of the product showed considerable affinity for the acid dye, Acid Phloxene 2G (Colour Index 29), indicating affinity of the product for acid dyes.

A test for softening power of the product was carried out as in Example 3, impregnating cotton cloth samples respectively with a 2% and with a ¾% solution of the product solubilized with acetic acid. The cloths were softened thereby. The cloth samples still showed softness although the severe scour and mild soaping respectively had removed some of the softness.

On adding a soap solution to a solution of the product a white, water-insoluble colloid was formed and thus the softness in the cloth may be attributed to the taking up by the cloth of the insoluble colloid formed by the interaction of the cation-active product and the anion-active soap of the scouring and soaping solutions.

Cotton cloths were impregnated with a solution of the product and then aftertreated with solutions of the anion-active materials Gardinol WA (sodium salt of sulfated technical lauryl alcohol + anhydrous sodium sulfate), Igepon T powder (reaction product of oleic acid and amino-ethane-sulfonic acid) and Textile Kwiksolv (a soap). The cloths were improved in softness by the aftertreatment.

Example 5

Monoethylol cyanamide and di-n-propylamine in equimolecular proportions were condensed as follows:

28.5 grams of monoethylol cyanamide were mixed with 23 grams of di-n-propylamine. These compounds were incompatible and 31 grams of concentrated hydrochloric acid were then added to this mixture with external cooling. After the addition of the hydrochloric acid was completed the cooling was discontinued and the temperature of the mixture rose to 90° C. The water was evaporated from the reaction mixture under a vacuum and the mixture then heated with stirring at 120–135° C. for ½ hour. The product on cooling was a wax-like fluffy paste, easily soluble in water and progressively less soluble respectively in alcohol and ether, insoluble in benzol and only sparingly soluble in hot benzol from which crystalline product separated on cooling.

Example 6

Monononethoxyethylol cyanamide and isoamylaniline hydrochloride were prepared and then condensed in equimolecular proportions as follows:

Monononethoxyethylol cyanamide was prepared as follows: 123 grams (1 mol.) of calcium cyanamide (65%), 50 cc. of water and 443 grams (10 mols.) of ethylene oxide were reacted under pressure in a steel bomb to a maximum temperature of 180° C. The reaction mixture in the bomb was a yellow oil-like liquid containing calcium hydroxide and inert materials originally present in the calcium cyanamide. The mixture was filtered and carbon dioxide was passed through the filtrate until no more calcium was precipitated. The calcium carbonate formed was filtered off and the filtrate evaporated under reduced pressure until all the water was eliminated. The yield of product was 470.4 grams which is about 98% of theoretical. The product was an amber colored oil-like liquid and its water solution had a pH of 9.

Isoamylaniline hydrochloride was prepared as follows: To 48.94 grams (0.3 mol.) of isoamylaniline were added dropwise with stirring 33 cc. of concentrated hydrochloric acid (a slight excess). After the addition of the acid was completed the product was soluble in water and acid to litmus. The isoamylaniline hydrochloride was separated from the accompanying water by distillation under reduced pressure.

The condensation product was prepared as follows: To the crystalline isoamylaniline hydrochloride in the distillation flask were added 144.9 grams of the monononethoxyethylol cyanamide prepared as described above and the mixture was heated on a steam bath until a uniform viscous oil-like liquid of amber color was formed. This product was miscible with water, chloroform, acetone, ethyl alcohol (2B) and was incompatible with ether and toluene. An aqueous solution of the product when added to a solution of sodium dioctyl sulfosuccinate, an anion surface active agent, formed a water-insoluble colloid, thus indicating that the product is a cation-active material.

The product may be used by the methods mentioned in Example 2 for demulsifying petroleum emulsions of the water-in-oil type.

Example 7

Monoethylol cyanamide hydrochloride and aniline in equimolecular proportions were condensed as follows:

3.7 grams of monoethylol cyanamide hydrochloride were mixed with 2.8 grams of aniline without heating, the temperature of the mixture rising from 26° C. to 30° C. The exothermic reaction became more noticeable when the mixture was heated with steam. The reaction product was a yellow, oil-like material easily soluble in warm water, sparingly soluble in cold water, and insoluble in toluene. Its aqueous solution was alkaline.

Example 8

Monoethylol cyanamide hydrochloride and diphenylamine in equimolecular proportions were condensed as follows:

0.96 part by weight of monoethylol cyanamide (90%) were neutralized with concentrated hydrochloric acid. To this mixture was then added 1.7 parts by weight of diphenylamine and the mixture heated slowly with stirring to 150° C. The resulting grey-brown, grease-like product was dispersible in water, sparingly soluble in alcohol and insoluble in benzol.

Example 9

Diethylol dicyandiamide, the dimer of monoethylol cyanamide, was formed and then condensed with dodecylamine, the dimer requiring but one-half the molecular equivalent necessary for the condensation of the amine with the unpolymerized mono-ethylol cyanamide. The production of the dimer and the condensation thereof with the dodecylamine was carried out as follows:

Preparation of diethylol dicyandiamide: 57.4 grams of monoethylol cyanamide (90%) were heated slowly with stirring to 150° C. and held at 130–140° C. for 15 minutes in order to form the dimer thereof, diethylol dicyandiamide.

To the reaction product were added 55.7 grams of dodecylamine and the mixture consisting of two incompatible layers was cooled to room temperature and 50 grams of acetic acid then added slowly with stirring. The mixture was then heated with continuous stirring to 135° C. and held at 130–135° C. for 30 minutes. Upon cooling of the reaction mass the product was an amber colored, viscous liquid which was readily soluble in water and on shaking foamed abundantly.

What I claim is:

1. Condensation products of the structural formula

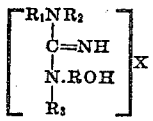

in which R is one of the group consisting of alkyl, alkoxyalkyl and hydroxyalkyl radicals, $R_1$ is one of the group consisting of an alkyl radical having at least 4 carbon atoms, an aralkyl radical having at least 3 carbon atoms in an alkyl group, and an aryl radical, $R_2$ is one of the group consisting of hydrogen, alkyl, aralkyl and aryl radicals, $R_3$ is one of the group consisting of hydrogen and the residue

wherein R is as defined above, and X is a salt-forming acid, said products ranging from oily to waxy materials and being producible by heating an amine of the formula $R_1NHR_2$ in which $R_1$ and $R_2$ are as defined above together with a monoalkylol cyanamide of the formula $(NCNH.ROH)_n$ in which R is as defined above and $n$ is a number not greater than 2, in the presence of an acid at least as strong as acetic acid.

2. The condensation products of the structural formula

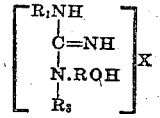

in which R is one of the group consisting of alkyl, alkoxyalkyl and hydroxyalkyl radicals, $R_1$ is an alkyl radical containing at least 4 carbon atoms, $R_3$ is one of the group consisting of hydrogen and the radical $$\overset{\underset{\mid}{C}}{\underset{\mid}{NH.ROH}}$$

in which R is as defined above, and X is a salt-forming acid, said products ranging from oily to waxy substances and being producible by heating a primary aliphatic amine containing at least 4 carbon atoms together with a monoalkylol cyanamide having the structural formula $(NCNH.ROH)_n$ in which R is as defined above and $n$ is a number not greater than 2, in the presence of an acid at least as strong as acetic acid.

3. The condensation product of the structural formula $$\left[\begin{array}{c} C_{12}H_{25}NH \\ \mid \\ C=NH \\ \mid \\ HNCH_2CH_2OH \end{array}\right] X$$

in which X is a salt-forming acid, said product being a wax-like substance easily dispersible in cold water and soluble in warm water and being producible by heating dodecylamine together with monoethylol cyanamide in the presence of an acid at least as strong as acetic acid.

4. The condensation product of the structural formula $$\left[\begin{array}{c} C_{12}H_{25}NH \\ \mid \\ C=NH \\ \mid \\ HN(CH_2)_2CHOH \end{array}\right] X$$

in which X is a salt-forming acid, said product being a waxy substance which disperses in cold and warm water, foams on shaking with water, is completely soluble in warm, dilute hydrochloric acid and being producible by heating dodecylamine together with monoisopropylol cyanamide in the presence of an acid at least as strong as acetic acid.

5. The condensation product of the structural formula $$\left[\begin{array}{c} R_1NH \\ \mid \\ C=NH \\ \mid \\ HNCH_2CH(OH)CH_2OH \end{array}\right] X$$

in which $R_1$ is a mixture of alkyl radicals containing 16 and 18 carbon atoms, the 16 carbon chain predominating in the mixture, and X is a salt-forming acid, said product being a waxy paste, dispersible in water, and being producible by heating a primary amine of the structural formula $R_1NH_2$ in which R is as defined above, together with mono-2,3-dihydroxypropyl cyanamide in the presence of an acid at least as strong as acetic acid.

6. The method of producing surface active condensation products which comprises heating one of the group consisting of a monoalkylol cyanamide and the dimer thereof together with an amine of the formula $R_1NHR_2$ in which $R_1$ is one of the group consisting of an alkyl radical having at least 4 carbon atoms, an aralkyl radical having at least 3 carbon atoms in an alkyl group and an aryl radical, and $R_2$ is one of the group consisting of hydrogen, alkyl, aralkyl and aryl radicals, in the presence of an acid at least as strong as acetic acid.

7. The method of producing surface-active condensation products which comprises heating one of the group consisting of a monoalkylol cyanamide and the dimer thereof together with a primary aliphatic amine having at least 4 carbon atoms, in the presence of an acid at least as strong as acetic acid.

WALTER P. ERICKS.